United States Patent
Ueno

(10) Patent No.: US 7,876,809 B2
(45) Date of Patent: Jan. 25, 2011

(54) CODE DIVISION MULTIPLE ACCESS (CDMA) RECEIVING DEVICE, AND PATH SEARCHING METHOD

(75) Inventor: Masayoshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 11/816,430

(22) PCT Filed: Feb. 16, 2006

(86) PCT No.: PCT/JP2006/302728

§ 371 (c)(1),
(2), (4) Date: Aug. 16, 2007

(87) PCT Pub. No.: WO2006/088089

PCT Pub. Date: Aug. 24, 2006

(65) Prior Publication Data

US 2009/0010314 A1    Jan. 8, 2009

(30) Foreign Application Priority Data

Feb. 16, 2005    (JP)    ............... 2005-038544

(51) Int. Cl.
*H04B 1/00*    (2006.01)
(52) U.S. Cl. .................... 375/147; 375/150
(58) Field of Classification Search ............... 375/147, 375/150
See application file for complete search history.

(56) References Cited

U.S. PATENT DOCUMENTS

| | | | |
|---|---|---|---|
| 6,430,166 B1 * | 8/2002 | Bejjani et al. | 370/320 |
| 2002/0064217 A1 * | 5/2002 | Ohsuge | 375/152 |
| 2003/0026233 A1 * | 2/2003 | Ohsuge | 370/342 |
| 2003/0133493 A1 * | 7/2003 | Suzuki et al. | 375/130 |
| 2004/0071193 A1 * | 4/2004 | Atarashi et al. | 375/144 |

(Continued)

FOREIGN PATENT DOCUMENTS

JP    9-181704 A    7/1997

(Continued)

OTHER PUBLICATIONS

Mitsugi, "Path-search algorithm introducing path-management tables for a DS-CDMA mobile terminal", The 13th IEEE International Symposium on Personal, Indoor and Mobile Radio Communications, 2002, vol. 2 Publication Year: 2002, pp. 730-734 vol. 2.*

*Primary Examiner*—Juan A Torres
(74) *Attorney, Agent, or Firm*—Sughrue Mion, PLLC

(57) ABSTRACT

Upon receiving an instruction to open a radio link, a path management unit designates, for one radio link, a spreading code number for a common pilot channel and a spreading code number for an individual channel to a spreading code generator. The spreading code generator generates spreading codes for the respective channels and sends them to a correlator. The correlator outputs the correlation values between a reception signal (IQ signal), the common pilot channel, and the individual channel. A delay profile unit generates delay profiles concerning the common pilot channel and individual channel by in-phase-adding and power-adding correlation values from the correlator for each channel. The path management unit detects path timings from both the delay profiles concerning the common pilot channel and individual channel, and assigns path timings TM to finger units in descending order of reception power. This improves the stability of reception quality.

4 Claims, 3 Drawing Sheets

U.S. PATENT DOCUMENTS

| | | |
|---|---|---|
| 2004/0091026 A1* | 5/2004 | Nakayama ................... 375/148 |
| 2004/0105382 A1* | 6/2004 | Miyoshi et al. ............. 370/204 |
| 2006/0067384 A1* | 3/2006 | Zhang et al. ................ 375/148 |

FOREIGN PATENT DOCUMENTS

| | | |
|---|---|---|
| JP | 2001-339325 A | 12/2001 |
| JP | 2004-120643 A | 4/2004 |
| JP | 2004-289191 A | 10/2004 |

* cited by examiner

CODE DIVISION MULTIPLE ACCESS (CDMA) RECEIVING DEVICE, AND PATH SEARCHING METHOD

TECHNICAL FIELD

The present invention relates to a CDMA (Code Division Multiple Access) receiving apparatus and path searching method which generate delay profiles from both a common pilot channel on which no transmission power control is performed and an individual channel on which transmission power control is performed, and search for effective paths from the generated delay profiles.

BACKGROUND ART

Conventionally, in mobile communication, since reception waves in multipath propagation vary in propagation path length, multipath waves with different propagation delay times interfere with each other. A CDMA receiving apparatus band-spreads information data by using a high-rate spreading code with a period shorter than a propagation time, and hence can separate/extract the respective multipath waves with different propagation delay times.

This CDMA receiving apparatus generates a power delay profile by de-spreading a pilot signal while shifting the time, searches for effective paths (path search) from the generated power delay profile, and performs in-phase combining (RAKE combining) with respect to the paths. This makes it possible to obtain a diversity effect and improve the reception characteristics.

A path search is the processing of gradually changing the timing of a spreading code by which a reception signal is multiplied, measuring correlation values at the respective timings, and determining the timings of several paths with large correlation values.

In general, path search processing uses a common pilot channel (CPICH) with transmission power relatively higher than that of an individual channel.

In addition, a power delay profile is generally generated by using a common pilot channel with transmission power higher than an individual channel (see, for example, reference 1 (Japanese Patent Laid-Open No. 9-181704) and reference 2 (Japanese Patent Laid-Open No. 2004-120643)).

In addition, as de-spreading processing for pilot signals, there has also been proposed a method of calculating correlations with reception signals while switching a spreading code for a common pilot channel and a spreading code for an individual channel (see, for example, reference 3 (Japanese Patent Laid-Open No. 2004-289191).

Note that as the reception quality on an individual channel deteriorates, transmission power control increases the transmission power of a base station. No transmission power control is performed on the common pilot channel.

DISCLOSURE OF INVENTION

Problem to be Solved by the Invention

In the above conventional CDMA receiving apparatus, however, since no transmission power control is performed on a common pilot channel unlike an individual channel, when a propagation environment deteriorates due to fading or the like, the reception power decreases accordingly. This causes a deterioration in path search characteristics.

The technique disclosed in reference 3 calculates the correlations with reception signals while switching the spreading code for the common pilot channel and the spreading code for the individual channel, and hence can perform a path search with higher accuracy than in the techniques disclosed in references 1 and 2. When, however, the propagation environment deteriorates upon switching to the spreading code for the common pilot channel, the path search characteristics deteriorate.

The present invention has been made to solve such a problem, and has as its object to provide a CDMA receiving apparatus and path searching method which can improve the stability of reception quality.

Means of Solution to the Problem

In order to achieve the above object, according to the present invention, there is provided a CDMA receiving apparatus characterized by comprising delay profile generating means for generating, for one radio link, delay profiles from both a common pilot channel on which no transmission power control is performed and an individual channel on which transmission power control is performed, and path search means for searching for effective paths on the basis of the delay profiles generated by the delay profile generating means. With this arrangement, the present invention generates delay profiles from both a common pilot channel and an individual channel, and searches for effective paths on the basis of the generated delay profiles.

Effect of the Invention

The present invention searches for effective paths on the basis of delay profiles generated from both a common pilot channel and an individual channel. With this operation, even if the reception power of the common pilot channel decreases due to fading or the like, high-speed power control on the individual channel allows to expect a relative increase in the reception power of the individual channel, thereby improving the stability of reception quality.

BEST MODE FOR CARRYING OUT THE INVENTION

Figure 1:
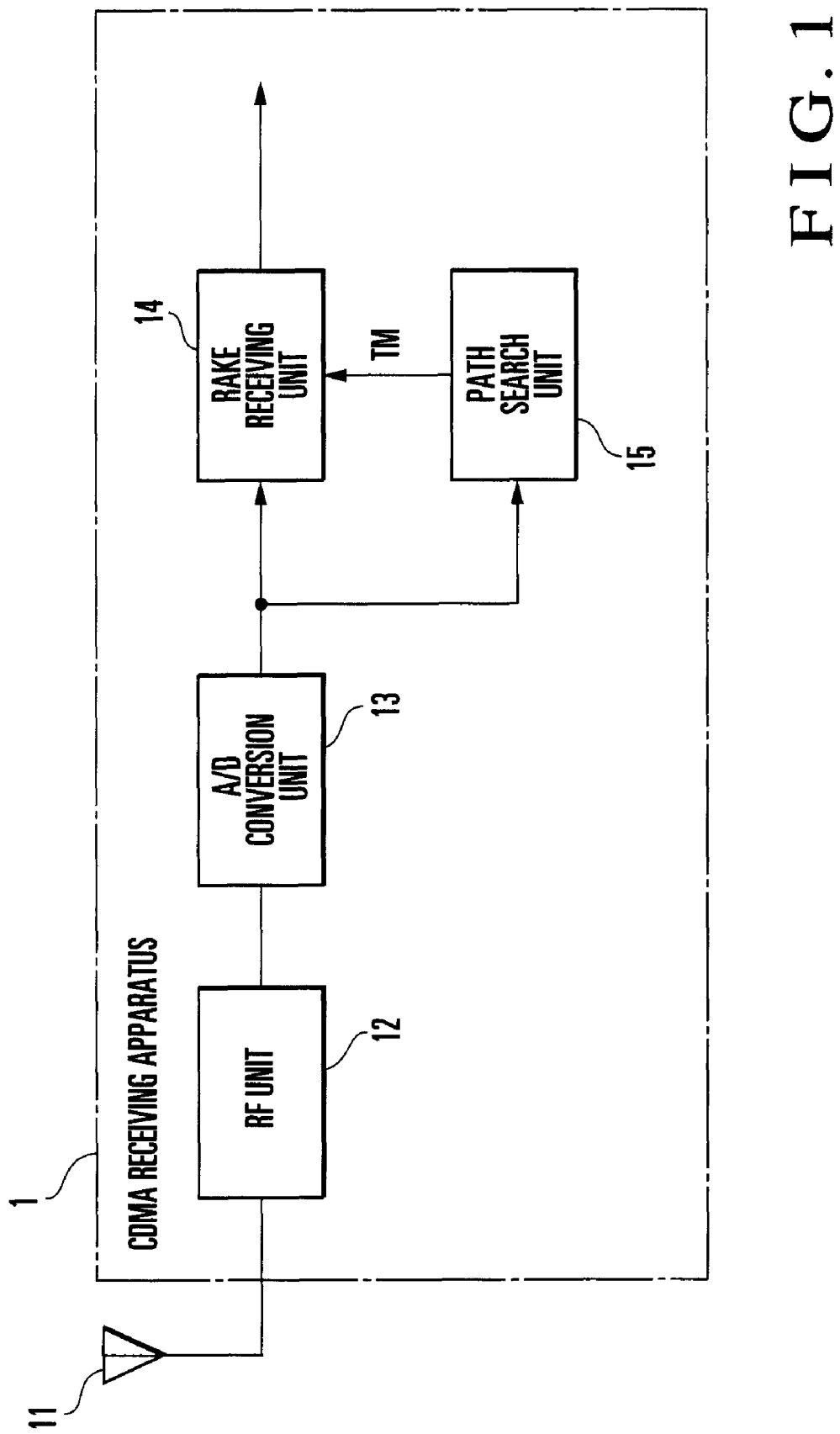
FIG. 1 is a block diagram showing the basic arrangement of a CDMA receiving apparatus according to the present invention.

The present invention will be described in detail below with reference to the accompanying drawings. FIG. 1 is a block diagram showing the basic arrangement of a CDMA receiving apparatus according to the present invention. Referring to FIG. 1, a CDMA receiving apparatus 1 comprises an antenna 11, an RF (Radio Frequency) unit 12, an A/D (analog/digital) conversion unit 13 which converts an analog signal into a digital signal, a RAKE receiving unit 14, and a path search unit 15.

The path search unit 15 detects path timings from reception signals, and notifies the RAKE receiving unit 14 of path timings TM. The RAKE receiving unit 14 de-spreads reception signals by using the respective fingers on the basis of the path timings TM input from the path search unit 15, and combines the resultant signals to output reception symbol data to the subsequent stage.

FIRST EMBODIMENT

Figure 2:
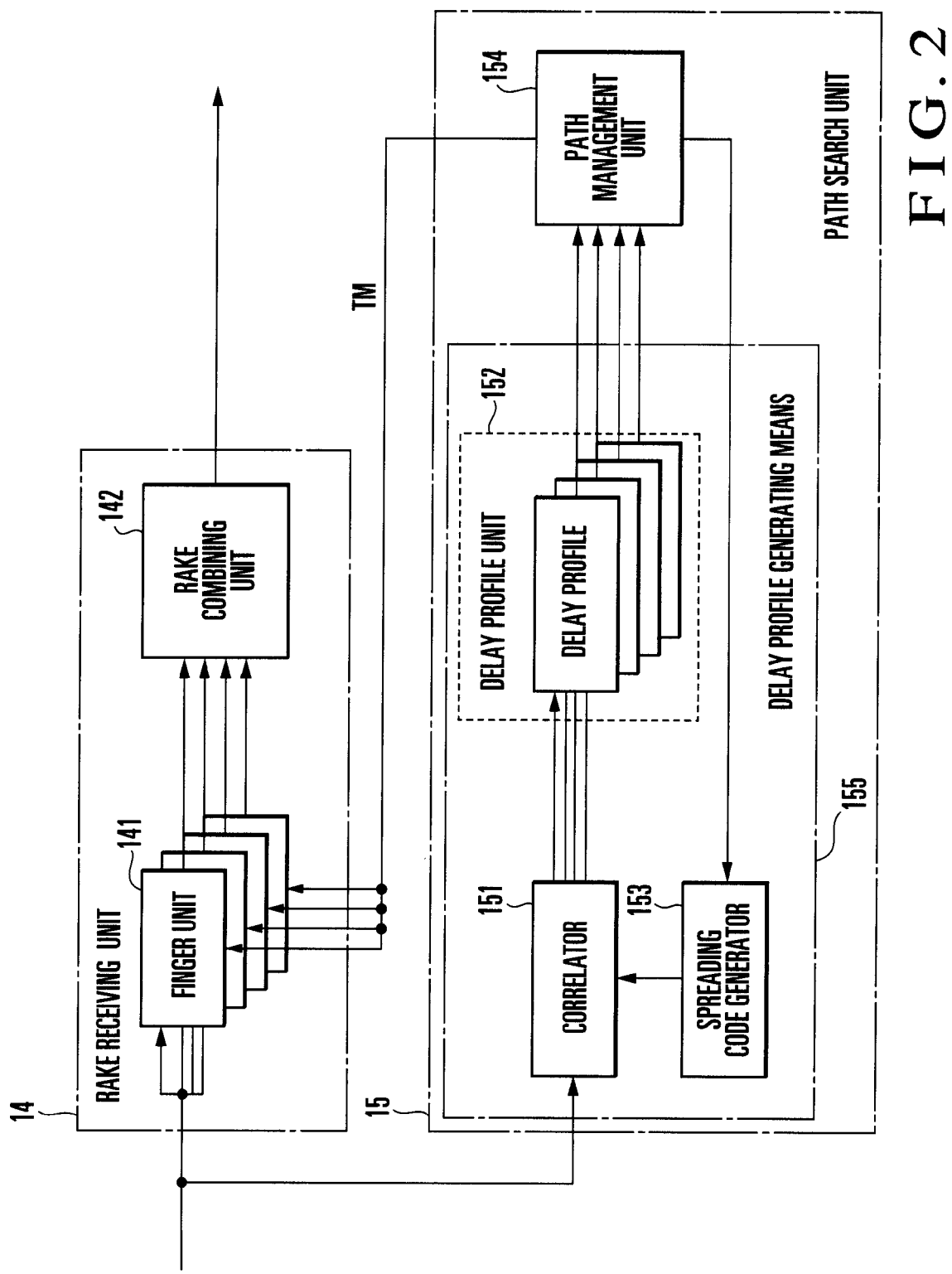
FIG. 2 is a block diagram showing the arrangement (first embodiment) of a RAKE receiving unit and path search unit.

FIG. 2 is a block diagram showing the arrangement (first embodiment) of a RAKE receiving unit 14 and path search unit 15. Referring to FIG. 2, the RAKE receiving unit 14 comprises finger units 141 and a RAKE combining unit 142. The path search unit 15 comprises a correlator 151, delay profile unit 152, spreading code generator 153, and path management unit 154. In the path search unit 15, the correlator 151, delay profile unit 152, and spreading code generator 153 constitute a delay profile generating means 155. The path management unit 154 corresponds to a path search means in the present invention.

The spreading code generator 153 generates a spreading code in accordance with an instruction from the path management unit 154, and sends the generated spreading code to the correlator 151. The correlator 151 outputs the correlation value between a reception signal (IQ signal) and spreading code. The delay profile unit 152 generates a delay profile by accumulating the correlation values output from the correlator 151. The path management unit 154 detects a peak timing from the delay profile and outputs the path timing TM to the RAKE receiving unit 14.

The operation of the path search unit 15 shown in FIG. 2 will be described next. Referring to FIG. 2, when an instruction to open a radio link (RL) is issued, the path management unit 154 designates, for one radio link with respect to the spreading code generator 153, a spreading code number for a common pilot channel on which no transmission power control is performed and a spreading code number for an individual channel on which transmission power control is performed to increase the transmission power of a base station (not shown) as the reception quality deteriorates.

The spreading code generator 153 generates a spreading code for each channel, and sends it to the correlator 151. The correlator 151 outputs the correlation values between a reception signal, a spreading code for a common pilot channel, and a spreading code for an individual channel. The delay profile unit 152 generates delay profiles concerning the common pilot channel and the individual channel by in-phase-adding or power-adding these correlation values. With this operation, the delay profile generating means 155 generates delay profiles while de-spreading a reception signal (pilot signal) while shifting the time.

Note that to perform in-phase addition in the delay profile unit 152 is to add correlation values for each of in-phase components (I components) and quadrature components (Q components) output from the correlator 151. To perform power addition is to obtain power values from the sum square of in-phase components (I components) and quadrature components (Q components) of the in-phase addition results and add the power values obtained by repeating this operation a plurality of number of times. This improves the quality of delay profiles.

When the generation of delay profiles is complete, the path management unit 154 detects a path timing from both the delay profile generated from the common pilot channel and the delay profile generated from the individual channel, and assigns the path timings TM corresponding to the number of fingers to the finger units 141 in descending order of reception power.

The finger units 141 perform synchronization detection and demodulation processing at the respective path timings. The RAKE combining unit 142 combines outputs from the finger units 141 and outputs the resultant data as reception symbol data to the subsequent stage. The path timings vary with variations in propagation environment. For this reason, the path management unit 154 updates delay profiles at predetermined time intervals, and updates the path timings TM assigned to the finger units 141.

As is obvious from the above description, the first embodiment searches for effective paths on the basis of the delay profiles generated from both the common pilot channel and the individual channel. With this operation, even if the reception power of the common pilot channel decreases due to fading or the like, high-speed power control on the individual channel allows to expect a relative increase in the reception power of the individual channel, thereby improving the stability of reception quality.

SECOND EMBODIMENT

Figure 3:
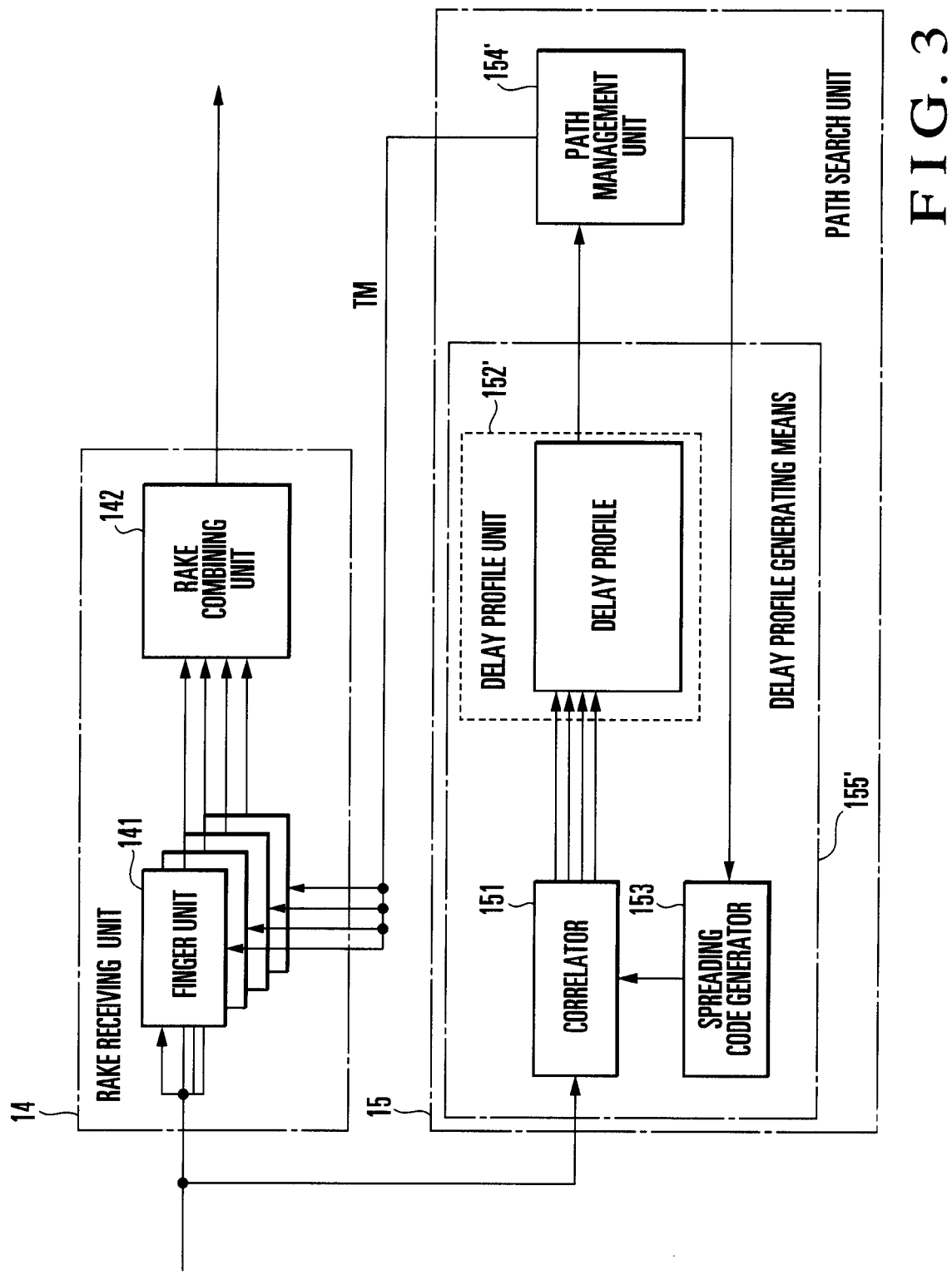
FIG. 3 is a block diagram showing the arrangement (second embodiment) of a RAKE receiving unit and path search unit.

Another embodiment (second embodiment) of the CDMA receiving apparatus according to the present invention will be described next. The basic arrangement of the CDMA receiving apparatus according to the second embodiment is the same as that shown in FIG. 1. However, a further contrivance is made to a delay profile generating method as compared with the first embodiment. FIG. 3 shows the arrangement of a RAKE receiving unit 14 and path search unit 15 in the second embodiment.

Referring to FIG. 3, a path management unit 154' designates, for one radio link, a spreading code number for the common pilot channel and a spreading code number for the individual channel to a spreading code generator 153 upon receiving an instruction to open the radio link. The spreading code generator 153 generates a spreading code for each channel and sends it to a correlator 151. The correlator 151 outputs the correlation values between the reception signal and the spreading code for the common pilot channel and between the reception signal and the spreading code for the individual channel.

A delay profile unit 152' in-phase-adds and power-adds the combination of correlation values from the correlator 151 to generate a delay profile as a combination of the correlation values between the common pilot channel and the individual channel. With this operation, a delay profile generating means 155' generates a delay profile by de-spreading the reception signal (pilot signal) while shifting the time.

When the generation of a delay profile is complete, the path management unit 154' detects path timings from the delay profile, and assigns path timings TM corresponding to the number of fingers to finger units 141 in descending order of reception power.

The finger units 141 perform synchronization detection and demodulation processing at the respective timings. A RAKE combining unit 142 combines outputs from the finger units 141 and outputs the reception symbol data to the subsequent stage. The path timings vary with variations in propagation environment. For this reason, the path management unit 154' updates delay the profile at predetermined time intervals, and updates the path timings TM assigned to the finger units 141.

In this manner, the second embodiment combines delay profiles concerning the common pilot channel and individual channel into one file, and hence can further reduce the circuit size.

INDUSTRIAL APPLICABILITY

The present invention can be applied to apparatuses using CDMA reception circuits in cellular phones, PCs (Personal Computers), card-type wireless models, and the like.

The invention claimed is:

1. A Code Division Multiple Access (CDMA) receiving apparatus comprising:
   delay profile generating means for generating, for one radio link, delay profiles from both a common pilot channel on which no transmission power control is performed and an individual channel on which transmission power control is performed; and
   path search means for searching for effective paths on the basis of the delay profiles generated by said delay profile generating means;
   wherein said delay profile generating means comprises:
      a spreading code generator which generates a spreading code for the common pilot channel and a spreading code for the individual channel; and
      a delay profile unit which generates a delay profile concerning the common pilot channel and a delay profile concerning the individual channel by accumulating correlation values between a reception signal, the spreading code for the common pilot channel, and the spreading code for the individual channel; and
   wherein said path search means comprises:
      means for detecting path timings from both the delay profile concerning the common pilot channel and the delay profile concerning the individual channel which are generated by said delay profile generating means, and searching for effective paths in descending order of reception power.

2. A CDMA receiving apparatus according to claim 1, wherein said delay profile generating means comprises means for generating, for one radio link, delay profiles from both the common pilot channel and the individual channel by de spreading pilot signals while shifting the time.

3. A path searching method in a Code Division Multiple Access (CDMA) receiving apparatus, the method comprising:
   a first step of a delay profile unit of the CDMA receiving apparatus generating, for one radio link, delay profiles from both a common pilot channel on which no transmission power control is performed and an individual channel on which transmission power control is performed; and
   a second step of a path search unit of the CDMA receiving apparatus searching for effective paths on the basis of the delay profiles generated in the first step;
   wherein the first step comprises:
      the step of generating a spreading code for the common pilot channel and a spreading code for the individual channel; and
      the step of generating a delay profile concerning the common pilot channel and a delay profile concerning the individual channel by accumulating correlation values between a reception signal, the spreading code for the common pilot channel, and the spreading code for the individual channel; and
   wherein the second step comprises:
      the step of detecting path timings from both the delay profile concerning the common pilot channel and the delay profile concerning the individual channel which are generated in the first step, and searching for effective paths in descending order of reception power.

4. A path searching method in a CDMA receiving apparatus according to claim 3, wherein the first step comprises the step of generating, for one radio link, delay profiles from both the common pilot channel and the individual channel by de-spreading pilot signals while shifting the time.

* * * * *